(12) United States Patent
Robbins

(10) Patent No.: US 8,684,237 B2
(45) Date of Patent: Apr. 1, 2014

(54) ADJUSTABLE MEASURING DISPENSER AND METHOD

(75) Inventor: Rodney W. Robbins, Florence, AL (US)

(73) Assignee: Fox Run USA, LLC, Ivyland, PA (US)

( * ) Notice: Subject to any disclaimer, the term of this patent is extended or adjusted under 35 U.S.C. 154(b) by 400 days.

(21) Appl. No.: 12/932,354

(22) Filed: Feb. 24, 2011

(65) Prior Publication Data

US 2012/0217270 A1 Aug. 30, 2012

(51) Int. Cl.
*B65D 88/54* (2006.01)

(52) U.S. Cl.
USPC ............ 222/305; 222/355; 222/359; 222/361

(58) Field of Classification Search
USPC ........... 222/14, 287, 434, 438–440, 448–450,
222/432, 453, 464.5, 354, 355, 359, 361,
222/362, 291, 305, 307, 308
See application file for complete search history.

(56) References Cited

U.S. PATENT DOCUMENTS

| | | | | |
|---|---|---|---|---|
| 922,085 A * | 5/1909 | Chamberlain | ................. | 222/439 |
| 1,684,313 A * | 9/1928 | Graham | ......................... | 222/439 |
| 1,726,370 A * | 8/1929 | Smith | ......................... | 235/87 R |
| 1,815,468 A * | 7/1931 | Favro | ............................. | 222/439 |
| 3,013,698 A * | 12/1961 | Gordon et al. | ................. | 222/158 |
| 3,089,620 A * | 5/1963 | Green et al. | ..................... | 222/89 |
| 4,151,933 A * | 5/1979 | Myers | ........................... | 222/288 |
| 4,174,058 A * | 11/1979 | Bassignani | .................... | 222/438 |
| 4,326,651 A * | 4/1982 | Sabase et al. | ................ | 222/439 |
| 4,505,407 A * | 3/1985 | Johnson | ..................... | 222/181.1 |
| 4,579,256 A * | 4/1986 | Heimlich | ....................... | 222/162 |
| 4,830,225 A * | 5/1989 | Heimlich | ....................... | 222/153.03 |
| 4,971,229 A * | 11/1990 | Heimlich | ....................... | 222/440 |
| 5,477,895 A * | 12/1995 | Willard | .......................... | 141/22 |
| 5,490,615 A | 2/1996 | Robbins et al. | | |
| 5,855,300 A * | 1/1999 | Malki | ....................... | 222/153.09 |
| 5,908,144 A * | 6/1999 | Dalton | ........................ | 222/185.1 |
| 6,382,461 B1 * | 5/2002 | Olsson | ............................ | 222/1 |
| 6,450,371 B1 * | 9/2002 | Sherman et al. | .............. | 222/361 |
| 6,929,158 B2 * | 8/2005 | Smiley | ............................ | 222/366 |
| 8,191,738 B2 * | 6/2012 | Esteve | ........................... | 222/361 |
| 2006/0169726 A1 * | 8/2006 | Hanaoka | ....................... | 222/438 |

* cited by examiner

*Primary Examiner* — Kevin P Shaver
*Assistant Examiner* — Michael J Melaragno
(74) *Attorney, Agent, or Firm* — Gregor N. Neff

(57) ABSTRACT

The dispenser dispenses premeasured quantities of a granular or powdered material when a lever on the dispenser housing is pressed inwardly. The quantity dispensed with each stroke of the lever can be adjusted easily by turning a dial on the outside of the housing. This adjusts the effective volume of a pair of telescoping tubes inside the dispenser. The dispenser is easily refilled merely by removing the top cap and pouring in the material to be dispensed.

17 Claims, 3 Drawing Sheets

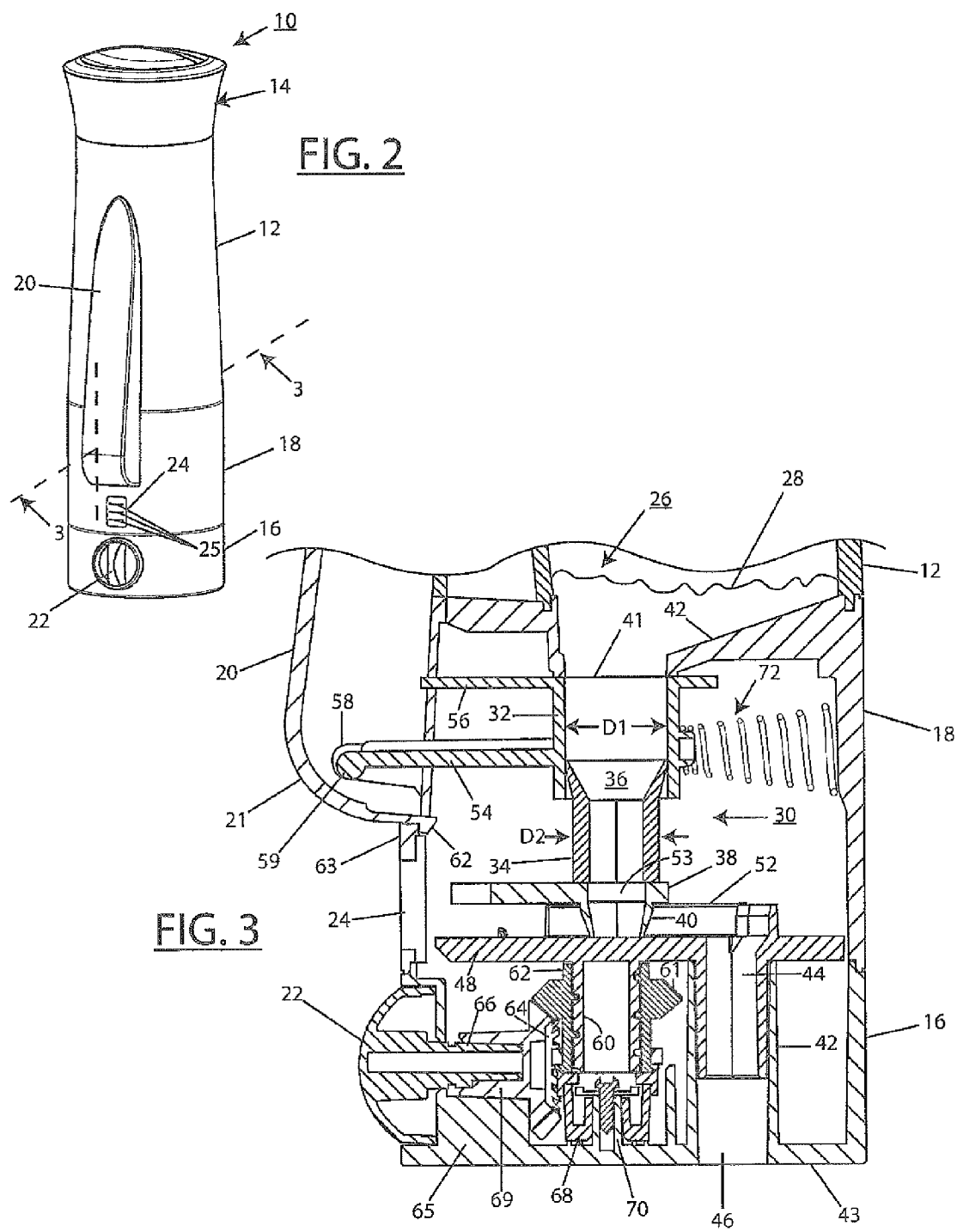

ADJUSTABLE MEASURING DISPENSER AND METHOD

CROSS-REFERENCE TO RELATED APPLICATIONS

Not Applicable

STATEMENT REGARDING FEDERALLY-SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

This invention relates to measuring dispensers, and particularly to adjustable measuring dispensers for granular materials.

(2) Description of Related Art Including Information Disclosed Under 37 CFR 1.97 and 1.98

Certain types of dispensers are now sold and used primarily for dispensing measured quantities of granular materials such as sugar, etc. for sweetening coffee, tea, cereal, etc. Those dispensers are in need of improvement.

Such prior dispensers usually are relatively tall, and have a "pistol-grip" type of lever which, when pushed by the user, causes a pre-measured quantity of granular material to be dispensed through an opening in the bottom. Thus, the user can hold the dispenser over a cup of coffee or tea, or a bowl of cereal, etc., and dispenses sugar or other sweetener by one or more actuations of the lever.

A problem with such dispensers is that it is relatively difficult to change the measured quantity of material dispensed with each stroke of the lever. Typically, this is done by providing removable measurement inserts, in which one insert is removed from the device and another is inserted in its place in order to change the quantity being dispensed with each stroke. For example, if the dispenser is set up to dispense a half-teaspoon with each stroke, and it is desired to change the measurement to one teaspoon, a ½ teaspoon measurement element is removed from the dispenser and replaced with a one-teaspoon element to change the amount dispensed to a full teaspoon for each stroke.

This scheme of adjustment is cumbersome and difficult, especially in that it requires the user to store spare elements in a drawer or other such place. The spare elements tend to get misplaced, and it can require some time to hunt for them. Moreover, even if the spare elements are not lost, it is an undesirably slow process to exchange elements.

Other prior adjustable measuring dispensers have been provided with dial-type adjustment means, so that a new quantity to be dispensed can be set by merely turning a dial. However, such prior dispensers suffer from other drawbacks, in that sometimes they are not easy to fill because the mechanism for adjustment is located at the top of the device. Also, some such devices do not dispense the material in a concentrated stream, but instead spread the material over a relatively wide area so that it sometimes is difficult to aim the dispensed quantity into a coffee or tea cup accurately.

Accordingly, it is an object of the invention to provide an adjustable measuring dispenser and method which alleviate or overcome the foregoing problems.

In particular, it is an object to provide a dispenser whose measurements can be adjusted quickly and easily, without having to replace parts of the dispenser.

It is a further object to provide such a dispenser in which extra parts need not be stored separately from the dispenser and are not therefore subject to loss.

Furthermore, it is an object of the invention to provide such a dispenser which operates freely and easily by the use of normal hand pressure by the user.

BRIEF SUMMARY OF THE INVENTION

It also is an object to provide such a dispenser which is relatively economical to build and which provides measurements frequently needed for sugar and other sweeteners, and other granular and powdered condiments.

In accordance with the present invention, the foregoing objects are met by the provision of a measuring dispenser which uses a collapsible measuring dispensing chamber to hold a variable amount of material to be dispensed by means of a hand-operated lever, and adjustment means for adjusting the volume of the chamber by collapsing or expanding the chamber to adjust its volume.

Preferably, the collapsible chamber comprises at least two telescoping tubes which are slidable relative to one another. The adjusting mechanism allows the user to easily adjust the positions of the tubes relative to one another to change the quantity of material dispensed.

No separate, easily-lost measuring elements need be handled or stored. Thus, the adjustment of the measuring device is relatively quick, easy, and reliable.

The foregoing and other objects of the advantages of the invention will be set forth in or apparent from the following description and drawings.

BRIEF DESCRIPTION OF THE SEVERAL VIEWS OF THE DRAWINGS

FIG. 2 is a front perspective view of the dispenser shown in FIG. 1;

FIG. 3 is cross-sectional view, partially broken-away, taken along line 3-3 of FIG. 2.

DETAILED DESCRIPTION OF THE INVENTION

General Description

Figure 1:
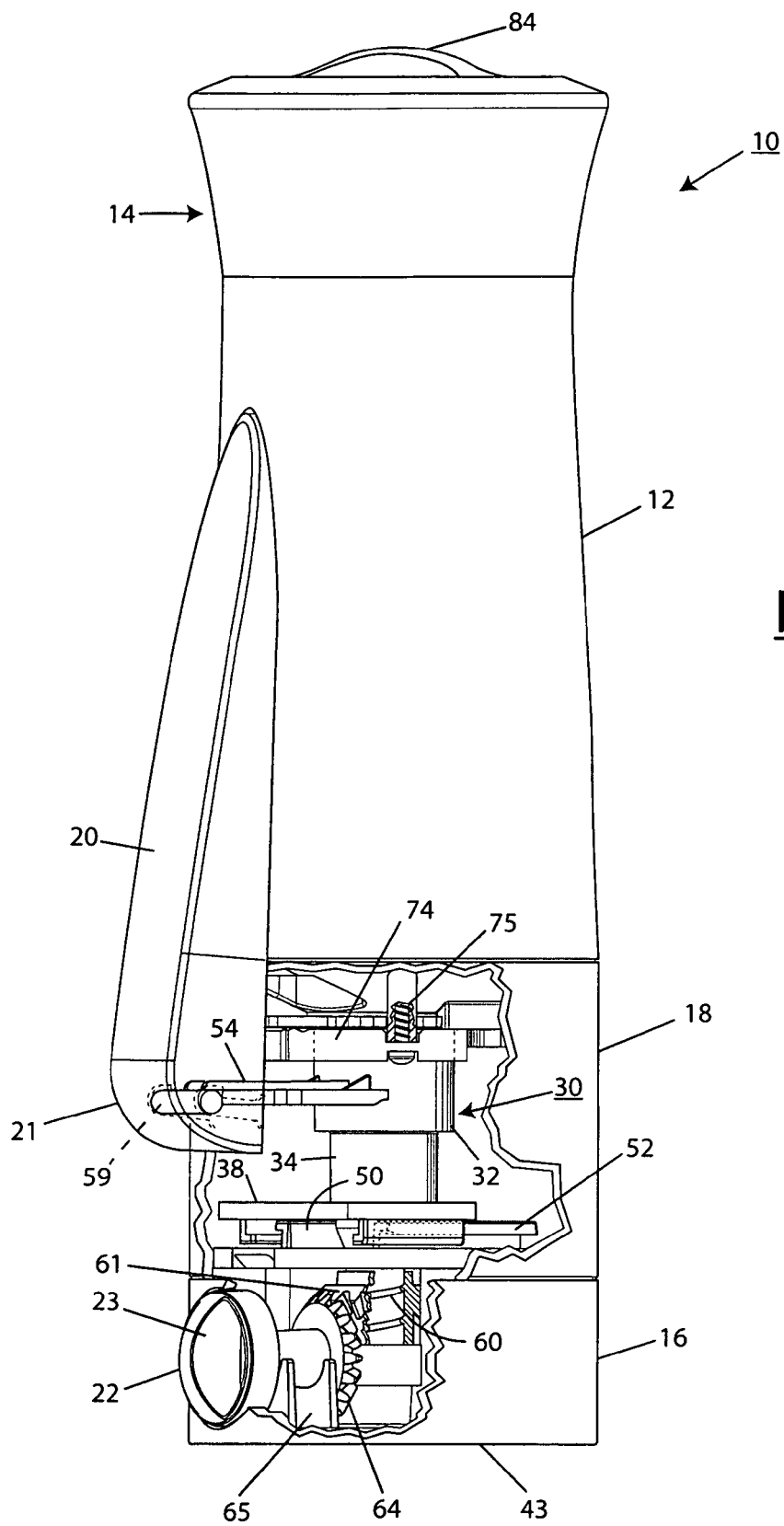
FIG. 1 is a side elevation view, partially broken-away, of an adjustable measuring dispenser constructed in accordance with the present invention.

The adjustable measuring dispenser 10 shown in FIGS. 1 and 2 includes a housing formed of an upper section 12, a lower section 16, and a middle section 18, all attached together. A screw-on cap 14 is provided. A dispensing lever 20 extends outside of the housing to be hand-operated to actuate the dispensing mechanism.

Referring now to FIG. 3, as well as FIGS. 1 and 2, the upper housing section 12 forms a storage chamber 26 for storing granular or powdered materials 28 such as sugar, artificial sweetener, salt, etc.

The storage chamber 26 can be refilled simply by removing the cap 14, pouring the material into the chamber through the open top of the dispenser, and replacing the cap.

In accordance with one feature of the invention, the quantity of material to be dispensed with each stroke of the lever 20 is varied simply by rotating a dial 22 which is accessible from the front of the dispenser.

A window 24 with horizontal markings 25 (FIG. 2) is provided for the purpose of indicating the setting of the dial 22, as it will be explained in greater detail below.

Referring to FIGS. 1 and 3, an outlet storage chamber structure 30 is provided directly beneath the outlet opening 41 of the storage chamber 26. The lower bottom wall 42 of the chamber 26 is sloped to guide the granular material 28 towards the outlet opening 41.

The dispenser 10 has a bottom wall 43. A dispensing outlet opening 46 is provided in the bottom wall. The opening 46 is offset laterally from the position of the outlet 41 of the storage chamber 26, and the outlet storage chamber structure 30 is mounted to move laterally towards and away from the outlet 46 in response to depressing the lever 20.

The outlet chamber 30 comes to a rest position (in which it is shown in FIG. 3) in which it is aligned with the opening 41 from the storage chamber 26 to be filled with granular material under the force of gravity. When the outlet chamber 30 is moved to the right into alignment with the outlet opening 46, the contents of the outlet chamber 30 are dispensed through the opening 46.

The outlet chamber 30 does not dispense more than its contents because its inlet opening moves to the right out of alignment with the opening 41 and cannot receive any additional material until it returns to its starting position beneath the opening 41.

Outlet Chamber

The outlet chamber 30 includes a pair of telescoping tubes 32 and 34. The tube 34 has an outside diameter $D_2$ which is smaller than the internal diameter $D_1$ of the tube 32. The tube 34 has a frustro-conical inlet opening 36 with an outer edge which makes close contact with the inner surface of the tube 32 to prevent or minimize the leakage of material through the junction point of the two tubes. Thus, the tube 34 can slide within the tube 32 with little or no leakage between the parts.

The outlet chamber 30 also includes a further tubular passageway 40 in a carriage structure 38. The passageway 40 has a slightly frustro-conical outlet portion which ensures that the contents of the outlet chamber will be accurately deposited through a tube 44 extending down from a plate 48 and through a tube 42 and the outlet 46 to be dispensed. The material is dispensed in a concentrated stream of material so that it will be easy to direct it into a coffee cup, or teacup, or an even smaller receptacle, or onto any object to be covered with the material.

The outside of the tube 44 and the inside of the tube 42 are slightly tapered to ensure that the tube 44 and the plate 48 can move upwardly and downwardly freely.

Figure 4:
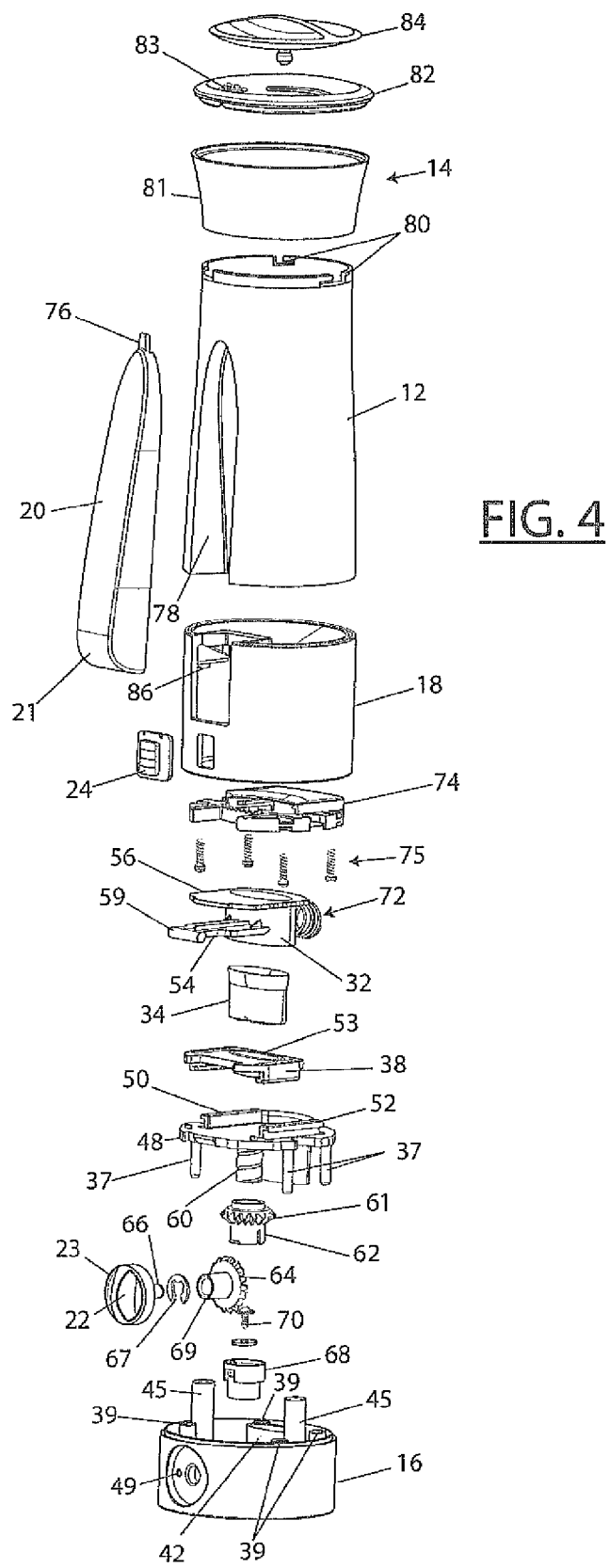
FIG. 4 is an exploded perspective view of the device shown in FIGS. 1-3.

As it is shown in FIGS. 1, 3 and 4, the carriage 38 travels on a pair of rails 50 and 52 which are mounted on the platform 48. The carriage 38 has downwardly extending L-shaped guides to guide it along the rails 50 and 52 with low friction, and to hold the carriage 38 onto the rails. The rails and guides preferably are molded from POM material, which is strong and has a low coefficient of friction.

The outlet chamber structure has a front extension member 54 with a rounded leading edge 59 which fits into a cavity 58 in the dispensing lever 20.

The outlet chamber structure also has an extending plate 56 at its upper edge.

The extension member 54 provides a means for communicating the pushing force on the lever 20 to the outlet chamber to move it from left to right, as shown in FIG. 3. The plate 56 is dimensioned to cover the outlet opening 41 of the storage chamber 26 when the outlet chamber 30 is moved towards the outlet 46 to prevent material from escaping unwantedly from the chamber 26.

When the outlet chamber 30 is returned to its rest position, the outlet opening 41 once again is in communication with the outlet chamber 30 to refill it.

A coil compression spring 72 is mounted between the right side wall of the housing section 18 and the side wall of the tube 32 to return the outlet chamber structure 30 and the lever 20 to its initial starting position. The lever 20 has a hooked end 65 which mates with a stop member 63 on the edge of the housing to stop the lever when it has returned to its starting position.

Measurement Adjustment Mechanism

The platform 48 (FIGS. 3 and 4) has a downwardly protruding tube 44 extending into a receptacle 42 defining the outlet opening 46. As shown in FIG. 4, the receptacle 42, the tube 44, and the outlet opening 46 are oval in cross-section.

Extending downwardly from the bottom of the platform 48 is a vertical tubular post 60 which has external helical threads, as shown primarily in FIG. 1, but also in FIG. 4. Surrounding the post 60 is a cylindrical internally-threaded member 62 whose threads match those on the post 60 and are shown engaged with those threads in FIG. 3.

The outside surface of the sleeve 62 has a bevel gear 61 (see FIG. 4 and FIG. 1). The dial 22 has a drive shaft 66 fitted into a hub 69 and a bevel gear 64 designed to mesh with the bevel gear 61. A lock washer 67 (FIG. 4) secures the two members 66 and 69 together. A support structure 65 (FIGS. 1 and 3) is provided in which the structure 66-69 rotates. The dial 22 has a flat central blade 23 which is easy to grasp when turning the knob.

Referring to FIG. 4, reference number 49 indicates part of a detent mechanism which mates with a structure (not shown) on the inside of the dial 22 to provide detent positions to define three or more different settings for the volume to be dispensed with each lever stroke. For example, the three settings could be ½ teaspoon, ¾ teaspoon, and 1 teaspoon.

When the knob 22 is rotated, the meshed spur gears rotate, thus turning the element 62, which then moves the threaded post 60 upwardly or downwardly to lift the platform 48 upwardly or drop it downwardly. This moves the rails 50, 52, and the carriage 38, as well as the smaller tube 34 towards or away from the outlet opening 42 to vary the effective volume of the outlet chamber.

Housing Structure

As it is shown in FIG. 4, a mounting block 68 and a screw 70 are provided for securely rotatably mounting the threaded member 62 in the housing.

Referring now to FIG. 4, the lower housing section 16 has two upstanding mounting posts 45 to which the parts above are mounted with screws (not shown).

Four hollow tubes 39 are provided to receive four downwardly-extending legs 37 which slide in the tubes to guide the vertical movements of the platform 48 and its attached mechanisms.

The structure 74 with the mounting screws 75 shown in FIGS. 1 and 4 mount and guide the motion of the outlet chamber structure 30 and the upper plate 56.

The tube 34 is secured to the carriage 38 in fixed alignment with the hole 53 in the carriage and the outlet member 40.

As shown in FIG. 4, the lever 20 fits into recesses 78 and 86 in the housing sections 12 and 18. A projection 76 at the top of the lever 20 fits into a cavity in the housing in which it pivots as the lower portion 21 of the lever 20 moves into and out of the housing.

The cap 14 includes a lower frustro-conical cylinder 81, a top wall 82 with shaker holes 83 and a selector cap 84 rotatable to uncover or cover the holes 83. Locking notches 80 in the upper edge of the housing section mate with locking tabs (not shown) in the lower edge of the cylinder 81 to provide a rapid-acting attachment mechanism to facilitate removal and replacement of the cap to refill the storage chamber 26.

The major parts of the dispenser are molded from plastic materials. The two housing sections 12 and 18 are heat-welded together, and the sections 16 and 18 are held together by screws threaded into the bosses 45.

Method of Use

In use, the dispenser is used by simply holding it over a cup, bowl or other receptacle or object to be acted on by the material dispensed, and pressing on the lever 20 and releasing it once or as many times as necessary to dispense the quantity desired.

If the user determines that too many strokes are required to dispense the desired quantity, the user merely turns the dial 22 to increase the quantity per stroke.

The window 24 allows the user to see the position of the platform 48, and the corresponding quantity dispensed per stroke. Preferably, the quantity is marked on the window.

If a quantity smaller than the current setting is desired, the dial 22 is turned to a lower setting.

The ability to choose a setting is beneficial to users in general, but is particularly beneficial to people whose hands shake and might dispense too much material from shakers or other dispensers.

The dispenser of the invention also is beneficial to those who need to restrict their intake of the materials and are aided by reliable measurements.

The dispenser can be used to dispense sugar and powdered artificial sweeteners to great advantage. Accurate measurement of sugar assures good tasting beverages or cereal etc. and use of the dispenser with artificial sweeteners avoids the need to handle and tear open the usual sweetener packets.

As it can be seen from the foregoing, the objective stated above for the invention have been met admirably by the structure and method described. The adjustment of the quantity of material dispensed can be made easily and quickly, simply by turning a dial on the device. No separate replacement parts need be stored, and the time taken to replace one with another is not needed. Therefore, the adjustment is easily and quickly made.

The device is easy to refill, simply by removing the top, filling it, and replacing the top. Moreover, the material is dispensed in a confined stream so as to make it easier to aim the contents into a tea cup, coffee cup, or similar receptacle.

The above description of the invention is intended to be illustrative and not limiting. Various changes or modifications in the embodiments described may occur to those skilled in the art. These can be made without departing from the spirit or scope of the invention.

The invention claimed is:

1. A granular material dispenser comprising
   a. a housing having a storage chamber for storing said material;
   b. a manually-operable dispensing lever extending from said housing;
   c. an adjustable dispensing mechanism mounted below said storage chamber in said housing and connected with said dispensing lever for selectively dispensing a predetermined quantity of said material from said chamber in response to actuation of said lever;
   d. said dispensing mechanism having an outlet chamber of variable volume and comprised of an assembly of at least two hollow, open-ended conduits, one sized and mounted to slide within the other, with the outlet of one of said conduits being an outlet for said chamber;
   e. said housing having a bottom wall with a bottom outlet opening through which said material is dispensed from said housing, said outlet opening being displaced laterally from said outlet chamber when said lever is not actuated to dispense material;
   f. said outlet chamber being movable by actuation of said lever from a first position with said outlet chamber being blocked, to a second position with said outlet chamber in communication with said outlet opening for dispensing the contents of said outlet chamber through said bottom outlet opening under the force of gravity, and
   g. an adjustment mechanism having a manually-operable adjustment member accessible from outside said housing and manually operable to adjust the position of said conduits relative to one another and thereby adjust the volume of said outlet chamber.

2. A device as in claim 1 including a structure for allowing said granular material to fill said outlet chamber from said storage chamber under the force of gravity when said outlet chamber is in said first position, and disconnecting said outlet chamber from said storage chamber when said outlet chamber is at said second position, and a resilient member for returning said outlet chamber to said first position when said lever is released.

3. A device as in claim 1 in which said adjustment mechanism comprises a threaded vertical post, a platform supporting said outlet chamber and closing its outlet when said outlet chamber is in said first position, a threaded member mounted on said post to slide up and down thereon, said threaded member having threads matching and engaged with the threads on said post, said adjustment member being coupled to rotate said threaded member to raise and lower said platform.

4. A device as in claim 3 in which said housing is elongated and has a longitudinal axis, said adjustment member is a rotary dial accessible from outside said housing, and including a shaft extending through one side of said housing transversely, to said longitudinal axis and drivably coupled to said dial, and a bevel gear structure driven by said shaft and coupled to rotate said threaded member.

5. A device as in claim 1 in which said lever is an elongated member pivoted at one end to said housing, with the opposite end of said lever engaging a drive mechanism in said housing, said lever being pivotable about said one end to actuate said dispensing mechanism.

6. A device as in claim 1 in which said outlet chamber comprises a pair of open-ended telescoping tubes.

7. A device as in claim 6 in which said tubes include a first tube having an interior surface with an inside diameter, a second tube fitted and dimensioned to slidably fit into said first tube and slide on said interior surface.

8. A device as in claim 7 in which said second tube has a flared inlet opening with an outer edge contacting said interior surface of said first tube, said second tube having a reduced outside diameter at longitudinal positions spaced from said outer edge.

9. A device as in claim 7 including a carriage having a further tube forming a further tubular passage for said outlet chamber and being mounted on rails to slide towards and away from said outlet opening, said second tube resting on said carriage in communication with said further passage to deliver granular material therethrough when dispensing said material.

10. A device as in claim 8 in which said second tube has an outlet end resting on and closed by a stationary platform when said tubes are in said first position, and communicating with said outlet opening of said housing when said tubes are in said second position.

11. A granular material dispenser comprising
   a. a housing having a storage chamber for storing said material;
   b. a manually-operable dispensing lever accessible from outside of said housing;
   c. said dispenser having in said housing an outlet chamber comprising a pair of open-ended tubes, one mounted to slide within the other to change the volume of said outlet chamber;
   d. said housing having a bottom wall with a bottom outlet opening from said housing, said outlet opening beings displaced laterally from said outlet chamber when said lever is not actuated;
   e. said outlet chamber being movable by actuation of said lever from a first position with said outlet chamber being blocked, to a second position with said outlet chamber in vertical communication with said outlet opening for dispensing the contents of said outlet chamber downwardly through said bottom outlet opening under the force of gravity, and
   f. an adjustment mechanism having a manually-operable adjustment member accessible from outside said housing and manually operable to adjust the longitudinal positions of said tubes relative to one another and thereby adjust the volume of said outlet chamber.

12. A device as in claim 11 in which said tubes are mounted on a carriage to move between said first and second positions, a first one of said tubes has an inside wall and an outside wall, and a second one of said tubes fits inside of a first one of said tubes in sliding contact with said inside wall of said first tube, said second tube having an outlet end, and a vertically movable platform for supporting and closing said second tube when it is located at said first position, but which does not close said second tube at said outlet end when it is located at said second position.

13. A method of dispensing granular materials, said method comprising the steps of
   (1) providing a granular material dispenser comprising
      a. a housing having a storage chamber for storing said material;
      b. a manually-operable dispensing lever extending from said housing;
      c. an adjustable dispensing mechanism mounted below said storage chamber in said housing and connected with said dispensing lever for selectively dispensing a predetermined quantity of said material from said chamber in response to actuation of said lever;
      d. said dispensing mechanism comprising at least two telescoping open-ended tubes forming an outlet chamber whose volume depends upon the positions of said tubes relative to one another;
      e. said housing having a bottom wall with a bottom outlet opening from said housing, said outlet opening being displaced laterally from said outlet chamber when said lever is not actuated;
      f. said outlet chamber being movable by actuation of said lever from a first position with said outlet chamber being blocked, to a second position with said outlet chamber in communication with said bottom outlet opening for dispensing the contents of said outlet chamber through said outlet opening, and
      g. an adjustment mechanism having a manually-operable adjustment member accessible from outside said housing while said housing is resting on said bottom wall on a horizontal surface and manually operable to adjust the relative positions of said tubes and thereby adjust the volume of said outlet chamber; and
   (2) setting said adjustment mechanism to a setting producing the dispensation of a desired amount of said material with each actuation of said lever.

14. A method as in claim 13 in which said housing is elongated and has a longitudinal axis and said adjustment mechanism comprises a rotary dial on outside of said housing at a location spaced laterally from said longitudinal axis, and said setting step comprises rotating said dial.

15. A method as in claim 14 in which said outlet chamber comprises a pair of telescoping tubes, and a drive mechanism coupling said dial to at least one of said tubes to selectively slide said tubes farther apart or closer together.

16. A method as in claim 13 in which said housing has a removable cover over said storage chamber, and the steps of removing said cover and pouring a supply of said material into said storage chamber.

17. A method as in claim 13 including providing a window in said housing to allow viewing of said outlet chamber structure to determine the present setting of said adjustment mechanism.

* * * * *